March 13, 1945. T. A. MARONEY 2,371,250
CENTRIFUGAL OR ROTARY PUMP
Filed March 17, 1943

Thomas A. Maroney,
INVENTOR.

BY
Victor J. Evans & Co.
ATTORNEYS

Patented Mar. 13, 1945

2,371,250

UNITED STATES PATENT OFFICE 2,371,250

CENTRIFUGAL OR ROTARY PUMP

Thomas A. Maroney, Cedar Grove, W. Va., assignor of three-twentieths to Saul Cohen, three-twentieths to Marvyn Cohen, three-twentieths to Louis Cohen, and two-twentieths to Harold F. Taylor, all of Charleston, W. Va.; Mary Ward Maroney executrix of said Thomas A. Maroney, deceased Application March 17, 1943, Serial No. 479,512

2 Claims. (Cl. 103—111)

My invention relates to improvements in centrifugal or rotary pumps.

The object of the invention is to provide means for preventing the fluid from the pump from leaking around the pump shaft and its bearings and gaining access to the motor operating the pump.

Another object of the invention is to provide a bearing for the pump shaft, in which friction is greatly reduced; and, at the same time, providing means whereby the grease from the bearings is prevented from reaching the motor.

A further object of the invention is to provide a pump of this character, in which the endwise thrust on the pump shaft is greatly reduced by the suction in the inlet port of the pump housing.

A still further object of the invention is to provide a simple and effective pump which can be cheaply manufactured and having certain details of structure and combination of parts hereinafter more fully described.

In the accompanying drawing—

Figure 1:
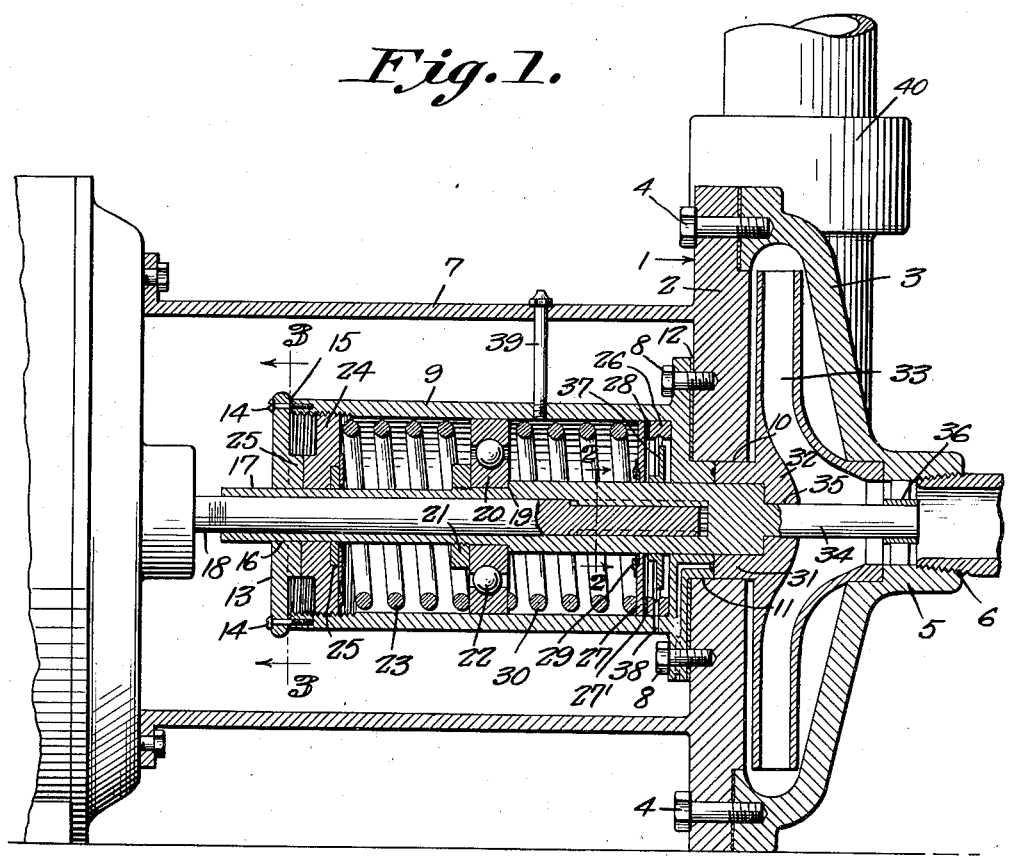
Figure 1 is a longitudinal sectional view of my improved pump.
Figure 2:
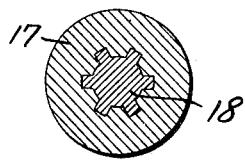
Figure 2 is a transverse sectional view, taken on the line 2—2 of Figure 1.
Figure 3:
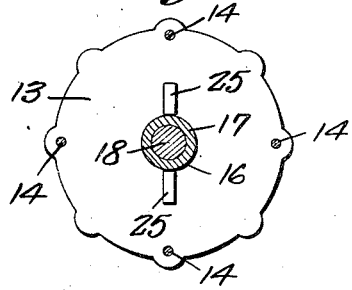
Figure 3 is a transverse sectional view, taken on the line 3—3 of Figure 1.

Referring now to the drawing, I represents the pump housing which is preferably made in two parts 2 and 3, bolted together by means of bolts 4. The outer part of the housing is provided with a hub-like member 5, with its outer end 6 open to form the fluid inlet for the housing. The rear end of the portion 2 of the housing is preferably provided with an integral cylindrical housing 7, in which is mounted the pump shaft bearing and the motor, as will be later more fully described.

Bolted to the inner face of the portion 2 of the pump housing, by means of bolts 8, is a bearing housing 9, which is preferably of an elongated cylindrical form. The portion 2 of the pump housing has a central opening 10, into which extends the flange 11, carried by the bearing housing 9. Arranged between the pump housing and the bearing housing is a gasket 12 to prevent leakage of the fluid passing through the pump and also the leakage of lubricating oil from the bearing. The inner end of the bearing housing 9 is opened and closed by the plate 13, held in place by the bolts 14. Between the plate 13 and the bearing housing 9 is a gasket 15, adapted to prevent leakage of lubricating oil from the bearing housing. The plate 13 is provided with a central opening 16, in which is mounted the sleeve 17, in which is splined the motor shaft 18. Any conventional form of motor is connected to the shaft 18 and arranged in the cylindrical housing 7, as clearly shown in Figure 1 of the drawing.

The sleeve 17 is provided, midway its length within the bearing housing, with a shoulder 19, against which the bearing race 20 is clamped by means of the nut 21. This bearing race is of the usual ball bearing type having the balls 22 mounted therein. Within the bearing housing is a coil spring 23, which has its inner end engaging the ball race and its outer end engaging an adjusting nut 24, internally threaded within the bearing housing. By this structure, it will be seen that the tension of the spring 23 is increased or decreased, as desired. In order to prevent the rotation of the adjusting nut 24, the plate 13 is provided with inwardly extending lugs 25, adapted to enter openings in the nut.

Arranged within the inner end of the bore of the bearing housing is a spacer ring 26, having, in its inner periphery, grooves for collecting the leakage around the sleeve. Within the bearing housing, beyond the spacer ring, is an oil retaining disc 27 which carries a gasket 28 at its outer end for engaging the spacer ring 26 and also the interior of the bearing housing 9. The retaining disc 27 is provided with a washer 29, which engages the outer periphery of the sleeve for forming a tight joint therewith. Within the bearing housing, beyond the ball race, is a second coil spring 30, which engages the inner face of the ball race. The opposite end of the coil spring engages the retaining disc 27, whereby the same is tightly held in position and pressure is exerted on the inner face of the ball race.

The sleeve 17 extends through the flange 11 and has secured thereon a flange 31, formed integral with the hub 32 of the rotary pump 33. The outer end of the sleeve is reduced, as indicated at 34, and passes through and tightly fits an opening 35 in the hub 32. Arranged within the inlet opening 6 of the pump housing is a bearing 36 in which is journaled the reduced end 34 of the sleeve. Mounted on the sleeve is a ring 37, which is adapted to throw any leakage around the sleeve outwardly into the grooves 27' in the spacer ring 26 and is discharged from the bearing housing through the passage 38. A lubricant is supplied to the bearing housing by means of a pipe 39 extending outwardly through the housing 7. The pump housing 1, at its periphery, at one side, is provided with a discharge opening 40.

In operation, the shaft 18 is driven by the motor which in turn rotates the sleeve 17 and causes the impeller to rotate. The thrust of the driven sleeved shaft section 34, common in the operation of centrifugal pumps and due to the pull of the suction normally prevailing in the pump, is to be adequately compensated for by a proper adjustment of the tensioning effect of the springs 23, 30, relatively to the ball race 20. Any leakage of fluid around the flange of the hub of the pump will find its way along the sleeve and will be thrown outwardly into the grooves 27' and discharged through the passage 38.

What I claim is:

1. A pump of the character described, comprising a pump housing having a central opening in one side and an inlet opening in the opposite side in alignment therewith, a bearing housing secured to the rear face of the pump housing and having an annular bearing flange entering the central opening in the pump housing, a sleeved shaft section extending through the bearing housing, the annular bearing flange, and the pump housing, a drive shaft engaged in the sleeve end of the shaft section and splined thereto, the opposite end of the shaft section slidably engaged in a bearing positioned within the inlet opening of the pump housing, an impeller within the pump housing and having its hub secured on the connected end of the sleeve portion of said shaft section, an annular bearing flange at one side of said hub and engaged in said central opening in spaced relation to the annular flange of said bearing housing, a ball race rigidly mounted on the sleeve within the bearing housing intermediate its ends, springs surrounding the sleeve and engaging opposite faces of the ball race, gaskets within the bearing housing and spaced from the pump housing, and a leakage discharge connected to the space between the gaskets and the pump housing.

2. A pump character described, comprising a pump housing having a central opening in one wall thereof and an inlet opening in the opposite wall in alignment therewith, a bearing housing secured to the rear face of the pump housing and having a flange entering the opening in the housing, a sleeve fastened to the bearing housing and longitudinally movable and entering the pump housing and having its outer end mounted in a bearing in the inlet of the pump housing, an impeller hub secured to the sleeve and having a flange entering the opening in the pump housing and abutting the flange carried by the bearing housing, a roller bearing rigidly mounted on the sleeve within the housing intermediate its ends, springs surrounding the sleeve and engaging opposite faces of the bearings, a drive shaft longitudinally movable in the sleeve, gaskets secured in the bearing housing and spaced from the pump housing, and a discharge connected to the space between the gaskets and the pump housing.

THOMAS A. MARONEY.